May 30, 1950        H. H. DAVIS        2,509,727
ROASTING AID
Filed June 5, 1947        2 Sheets—Sheet 1
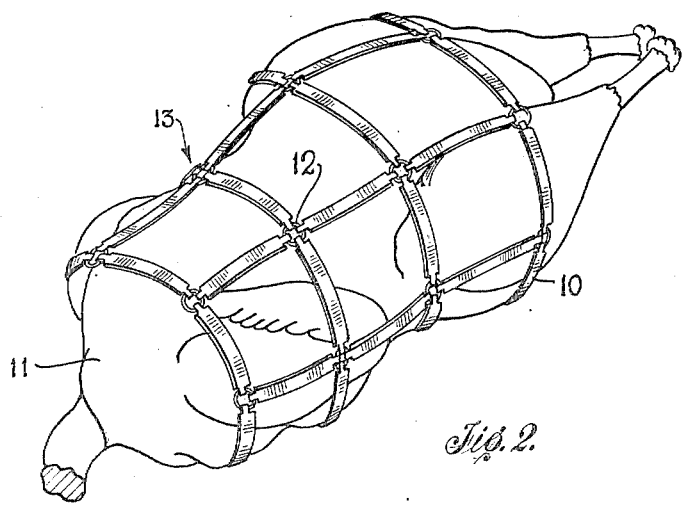
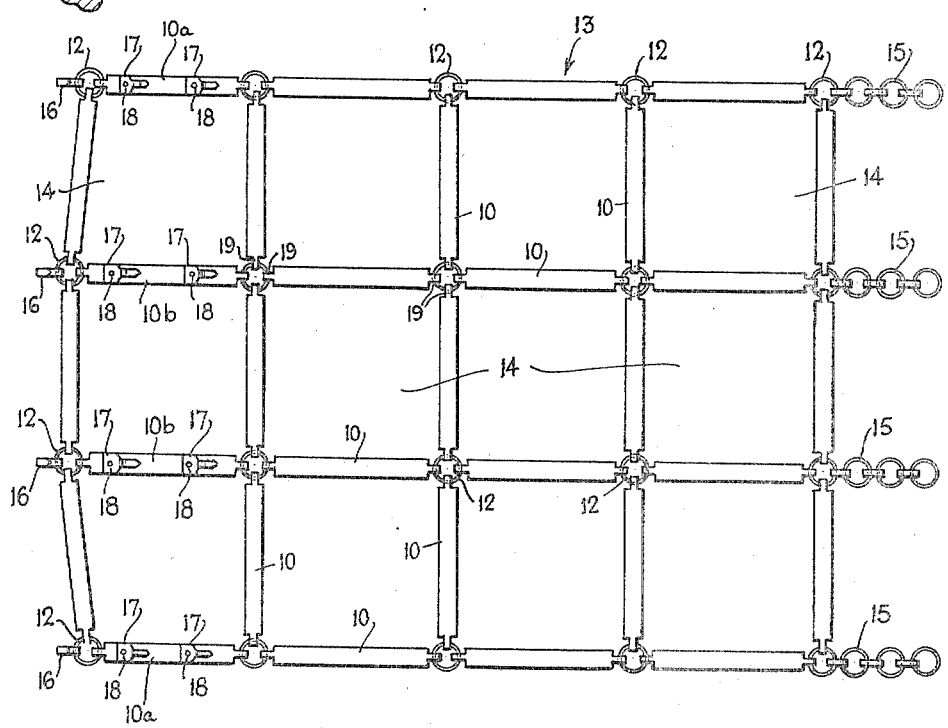
INVENTOR
HOMER H. DAVIS
BY
Ely & Frye
ATTORNEYS May 30, 1950  H. H. DAVIS  2,509,727
ROASTING AID Filed June 5, 1947  2 Sheets-Sheet 2

INVENTOR
HOMER H. DAVIS
BY Ely & Frye
ATTORNEYS

Patented May 30, 1950

2,509,727

UNITED STATES PATENT OFFICE 2,509,727

ROASTING AID

Homer H. Davis, Akron, Ohio

Application June 5, 1947, Serial No. 752,781

2 Claims. (Cl. 99—350)

This invention relates to a roasting aid for use in cooking fowl, roasts, hams and other meats which may require turning while being cooked in a pan.

It is well known that many difficulties are presented to a cook in the roasting of large meats and fowl, such as turkeys, geese and the like. More particularly the wings and legs of fowl protrude so as to interfere with proper seating of the fowl in the roasting pan and these members are frequently torn off. Also it is difficult to turn the fowl to different positions required to insure thorough cooking without removing same from the pan and subjecting the cook to injury from burns. Further difficulties are encountered in removing the cooked fowl from the pan.

An object of this invention is to provide a roasting aid formed of a plurality of relatively short, flat, flexible links pivotally joined together to form a unit which may be easily placed around a fowl and fitted closely thereto so as to press the wings and legs securely against the body.

Another object is to provide a plurality of spaced hooks at one end of the unit and a plurality of short chains at the other whereby adjustment is permitted so the device may be used with different size fowl and other meats.

A further object is to form the links in the unit relatively flat so they will not cut into the meat being cooked, and to join adjacent links by means of a ring which readily permits pivotal movement and flexing of the links around the meat.

Other objects and advantages will become apparent from the following description taken in conjunction with the accompanying drawings.

In the drawings:

Fig. 1 is a perspective view of a fowl with the roasting aid in proper position on same;

Fig. 2 is a plan view of the device in extended position;

Figure 3:
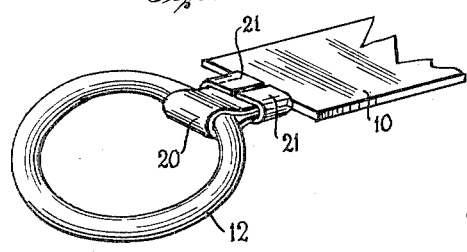
Fig. 3 is an enlarged broken perspective view showing one means for joining the links to the rings.

Referring to the drawings, the numeral 10 indicates a plurality of relatively short links formed of sheet aluminum or other suitable material of a thickness which will permit the links readily to flex and bend around a fowl 11 or the like, to attain substantially the position shown in Fig. 1. The links 10 are relatively flat so that they will not have a tendency to cut into and damage the meat, as would be the case if narrow material such as wire were used.

Each link 10 is pivotally connected at each end to a small ring 12 so as to be freely movable around these rings, with adjacent links joining each ring substantially at right angles to provide a relatively large, substantially rectangular-shaped unit 13 formed of a plurality of smaller substantially rectangular sections 14. In Fig. 2 the unit 13 is formed of twelve sections 14, but this number obviously may be increased or decreased as desired. Also, two of the end sections 14 may have their links 10—a shortened slightly to permit the unit to fit more snugly around a reduced portion of a fowl, such as the portion adjacent the neck.

At one end of unit 13 the rings 12 have one end of a small chain 15 pivoted thereto, and each chain is formed with a plurality of round links in the embodiment shown in Fig. 2. The other end of unit 13 has a hook 16 pivotally mounted to each ring 12, which hooks are adapted to receive selected links in the chains 15 to snugly fit around the fowl 11 or the like.

Figure 5:
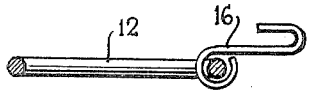
Fig. 5 is a similar view showing how the end hooks may be secured to the rings.
Figure 6:
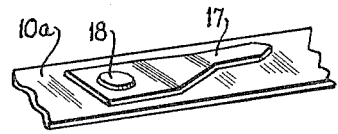
Fig. 6 is an enlarged broken perspective showing how the intermediate hooks may be formed on the links.
Figure 7:
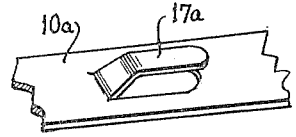
Fig. 7 is a similar view showing a modified type of hook pressed out of the links.

Fig. 5 clearly shows the preferred construction of the hooks 16, and in order to further increase the adjustability of the unit for different sizes of fowls and other meat, the end links 10—a and 10—b are provided with additional hooks 17 which are also adapted to receive selected links in the chains 15, as will be readily understood. In Figs. 2 and 6 the hooks 17 are shown as being riveted to the links 10—a and 10—b, by means of rivets 18, but these hooks may also be formed by stamping a portion such as is indicated at 17—a in Fig. 7, from the links 10—a and 10—b.

Figure 4:
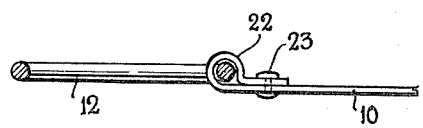
Fig. 4 is an enlarged side view, partly in section, showing a modified means for joining the links to the rings.
Figure 9:
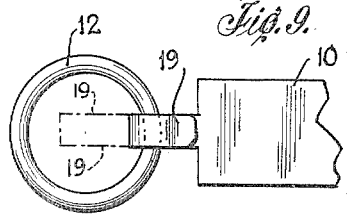
Fig. 9 is an enlarged plan view, partly broken away, showing a further modified means for joining the links to the rings.

Figs. 2 and 9 show one way of joining the links 10 to the rings 12 wherein a tongue 19 is formed on each end of each link and is then bent around the rings 12 so as to permit free movement of the links when the unit is placed around a piece of meat. Also, the links 10 may be joined to rings 12 by the modified means shown in Fig. 3 wherein tongues 20 having lateral wing portions 21 are formed on the ends of the links. These tongues 20 are first bent around the rings 16, after which the wings 21 are bent into the position shown in Fig. 3. Likewise, Fig. 4 shows another modified means for joining the links 10 and rings 12. In this embodiment the tongues 22 formed on the ends of links 10 are first bent around the rings 12 and then riveted as indicated at 23.

Figure 8:
Fig. 8 is an enlarged plan view of a modified form of link.
Figure 10:
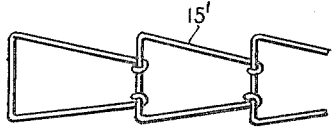
Fig. 10 is a partial plan view of a modified type of chain for the device.

In Fig. 8 a modified form of link 10' is shown which may be substituted for the links 10. As indicated, link 10' increases in width from each end toward the center to provide a wider central portion for engagement with the meat, which portion would have a greater tendency not to cut into and injure the meat. Fig. 10 shows a modified form of chain 15' which may be substituted for the chains 15.

In use, the unit 13 may be quickly and easily placed around the fowl 11 with selected links of the chains joined to selected hooks 16 or 17 to permit a snug engagement with the fowl. The fowl may be readily turned or lifted by engaging the unit with the fingers of the hands, or a separate lifting means, such as tongs (not shown) may be utilized.

While the preferred forms of the roasting aid have been illustrated and described, it will be apparent that the device is not limited to these forms, and various modifications and changes may be made therein without departing from the spirit of the invention or from the scope of the subjoined claims.

What is claimed is:

1. A roasting aid of sufficient size to encircle a fowl or the like, comprising a flexible unit of substantially rectangular shape formed from a plurality of relatively short, flat, flexible links arranged in spaced relation so as to provide a plurality of small, flexible, substantially rectangular shaped sections within said unit, rings pivotally connected to each end of each of said links, the arrangement being such that each of said small sections consists of at least four links and four rings, and means on the ends of said unit for securing same in adjustable engagement with said fowl.

2. A roasting aid of the character recited in claim 1 wherein each of said rings is common to at least two of said links, and some of said rings are common to four of said links.

HOMER H. DAVIS.

REFERENCES CITED

The following references are of record in the file of this patent:

UNITED STATES PATENTS

| Number | Name | Date |
|---|---|---|
| 735,629 | Weber | Aug. 4, 1903 |
| 985,113 | Conrad | Feb. 21, 1911 |
| 1,358,063 | Demuth | Nov. 9, 1920 |